US007266653B2

(12) United States Patent
Tross et al.

(10) Patent No.: US 7,266,653 B2
(45) Date of Patent: Sep. 4, 2007

(54) REMOTE DATA MIRRORING WITH ACKNOWLEDGMENT UPON WRITING COPIED DATA TO VOLATILE CACHE MEMORY

(75) Inventors: Martin Tross, Haifa (IL); Aviad Zlotnick, D.N. Galil Takhton (IL)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 10/673,744

(22) Filed: Sep. 29, 2003

(65) Prior Publication Data

US 2005/0071549 A1   Mar. 31, 2005

(51) Int. Cl.
*G06F 12/16* (2006.01)
(52) U.S. Cl. ............................. 711/162; 711/161; 711/6; 711/5
(58) Field of Classification Search ............... None
See application file for complete search history.

(56) References Cited

U.S. PATENT DOCUMENTS 5,454,099 A * 9/1995 Myers et al. ................... 714/6
6,173,377 B1 * 1/2001 Yanai et al. ................ 711/162
6,732,124 B1 * 5/2004 Koseki et al. .............. 707/202
6,823,336 B1 * 11/2004 Srinivasan et al. ............ 707/8
6,950,915 B2 * 9/2005 Ohno et al. ................ 711/162
2003/0031319 A1 * 2/2003 Abe et al. .................. 380/232
2003/0061240 A1 * 3/2003 McCann et al. ............ 707/200

FOREIGN PATENT DOCUMENTS

JP       2004013367 A  *  1/2004

OTHER PUBLICATIONS

Ji, Minwen et al., "Seneca: Remote Mirroring Done Write," Proceedings of USENIX Technical Conference, San Antonio, TX, pp. 253-268, Jun. 2003. USENIX, Berkeley, CA.

* cited by examiner

*Primary Examiner*—B. James Peikari (57) ABSTRACT

A method for storing data received from a host processor at a primary storage subsystem in a data storage system includes writing the data to a first volatile cache memory in the primary storage subsystem and copying the data from the primary storage subsystem to a secondary storage subsystem. The second subsystem writes the copied data to a second volatile cache memory and returns an acknowledgment to the primary storage subsystem responsively to writing the copied data to the second volatile cache memory and prior to saving the data in the second non-volatile storage media. The primary storage subsystem signals the host processor that the data have been stored in the data storage system responsively to the acknowledgment from the secondary storage subsystem.

40 Claims, 5 Drawing Sheets

REMOTE DATA MIRRORING WITH ACKNOWLEDGMENT UPON WRITING COPIED DATA TO VOLATILE CACHE MEMORY

FIELD OF THE INVENTION

The present invention relates generally to data storage systems, and specifically to data mirroring for failure protection in storage systems.

BACKGROUND OF THE INVENTION

Data backup is a standard part of all large-scale computer data storage systems (and most small systems, as well). Data written to a primary storage medium, such as a volume on a local storage subsystem, are copied, or "mirrored," to a backup medium, typically another volume on a remote storage subsystem. The backup volume can then be used for recovery in case a disaster causes the data on the primary medium to be lost. Methods of remote data mirroring are surveyed by Ji et al., in an article entitled "Seneca: Remote Mirroring Done Write," *Proceedings of USENIX Technical Conference* (San Antonio, Tex., June, 2003), pages 253-268, which is incorporated herein by reference. The authors note that design choices for remote mirroring must attempt to satisfy the competing goals of keeping copies as closely synchronized as possible, while delaying foreground writes by host processors to the local storage subsystem as little as possible.

Large-scale storage systems, such as the IBM Enterprise Storage Server (ESS) (IBM Corporation, Armonk, N.Y.), typically offer a number of different copy service functions that can be used for remote mirroring. Among these functions is peer-to-peer remote copy (PPRC), in which a mirror copy of a source volume on a primary storage subsystem is created on a secondary storage subsystem. When an application on a host processor writes to a PPRC volume on the primary subsystem, the corresponding data updates are entered into cache memory and non-volatile storage at the primary subsystem. The control unit (CU) of the primary subsystem then sends the updates over a communication link to the secondary subsystem. When the CU of the secondary subsystem has placed the data in its own cache and non-volatile storage, it acknowledges receipt of the data. The primary subsystem then signals the application that the write operation is complete.

PPRC provides host applications with essentially complete security against single-point failures, since all data are written synchronously to non-volatile media in both the primary and secondary storage subsystems. On the other hand, the need to save all data in non-volatile storage on both subsystems before the host write operation is considered complete can introduce substantial latency into host write operations. In some large-scale storage systems, such as the above-mentioned IBM ESS, this latency is reduced by initially writing data both to cache and to high-speed, non-volatile media, such as non-volatile random access memory (RAM), in both the primary and secondary subsystems. The data are subsequently copied to disk asynchronously (an operation that is also referred to as "hardening" the data) and removed from the non-volatile memory. The large amount of non-volatile memory that must be used for this purpose is very costly.

SUMMARY OF THE INVENTION

The present invention provides methods for data mirroring that can be used to create storage systems that are immune to single-point failures and have low-latency write response, without requiring special non-volatile memory or other costly components. In embodiments of the present invention, when a host writes data to a primary storage subsystem, the primary storage subsystem records the data in volatile cache memory, and transmits a copy of the data to the secondary storage subsystem. The secondary storage subsystem likewise writes the data to its cache, and sends an immediate acknowledgment to the primary storage subsystem. The primary storage subsystem then signals the host to acknowledge that the write operation has been completed, without waiting for the data to be written to the disk (or other non-volatile media) on either the primary or secondary storage subsystem.

Both primary and secondary storage subsystems keep a record of the address ranges of data that the other subsystem has received in its cache, but may not yet have copied to non-volatile storage. In the event of a failure in one of the subsystems, this record indicates which data will have to be copied back to the failed subsystem during recovery (in addition to any new data that may have been written to the operating subsystem during the period of the failure). From time to time, during normal operation, each subsystem informs the other of the address ranges that it has hardened, whereupon the other subsystem removes these ranges from its record. Thus, upon recovery from a failure, the amount of data that must be copied back to the failed subsystem is limited to the address ranges listed in the record maintained by the non-failed system, so that the time needed for full recovery is not too long.

Since data are recorded synchronously and records are maintained symmetrically on both the primary and secondary storage subsystems, the secondary storage subsystem can take the place of the primary storage subsystem immediately in case of a failure in the primary storage subsystem. Furthermore, read operations can be directed to either of the storage subsystems at any time.

There is therefore provided, in accordance with an embodiment of the present invention, a method for storing data in a data storage system that includes primary and secondary storage subsystems, including respective first and second volatile cache memories and respective first and second non-volatile storage media, the method including:

receiving the data at the primary storage subsystem from a host processor;

writing the data to the first volatile cache memory in the primary storage subsystem;

copying the data from the primary storage subsystem to the secondary storage subsystem;

writing the copied data to the second volatile cache memory in the secondary storage subsystem;

returning an acknowledgment from the secondary storage subsystem to the primary storage subsystem responsively to writing the copied data to the second volatile cache memory and prior to saving the data in the second non-volatile storage media;

signaling the host processor that the data have been stored in the data storage system responsively to the acknowledgment from the secondary storage subsystem; and transferring the data in the primary and secondary storage subsystems from the first and second volatile cache memories to the first and second non-volatile storage media, respectively.

In some embodiments, copying the data includes transmitting the data between mutually-remote sites over a communication link between the sites. Alternatively, the second volatile cache memory and the second non-volatile storage media are located in mutually-remote sites, and transferring the data includes transmitting the data from the second volatile cache memory to the second non-volatile storage media over a communication link between the sites.

Typically, copying the data includes creating a mirror on the secondary storage subsystem of the data received by the primary storage subsystem. The method may include, upon occurrence of a failure in the primary storage subsystem, configuring the secondary storage subsystem to serve as the primary storage subsystem so as to receive further data from the host processor to be stored by the data storage system. In one embodiment, the second volatile cache memory is located in a site remote from the primary storage subsystem and is operated by a service provider other than an owner of the primary storage subsystem, and transferring the data from the second volatile cache memory to the second non-volatile storage media includes processing the data on a fee-per-service basis.

In disclosed embodiments, transferring the data includes sending a message from the secondary storage subsystem to the primary storage subsystem indicating addresses of the data that have been transferred to the second non-volatile storage media, and the method further includes creating a record on the primary storage subsystem of the addresses of the data copied to the secondary storage subsystem, and updating the record in response to the message. Typically, the method includes, upon recovery of the system from a failure of the secondary storage subsystem, conveying, responsively to the record, a portion of the data from the primary storage subsystem to be stored on the secondary storage subsystem. Updating the record may include removing from the record the addresses of the data that have been transferred to the second non-volatile storage media.

In one embodiment, creating the record includes marking respective bits in a bitmap corresponding to addresses of the data copied to the secondary storage subsystem, and updating the record includes clearing the respective bits.

Additionally or alternatively, transferring the data includes transferring the data in a range of the addresses from the second volatile cache memory to the second non-volatile storage media, and sending the message includes informing the primary storage subsystem that the data in the range have been transferred, so that the primary storage subsystem updates the record with respect to the range. In one embodiment, transferring the data in the range includes destaging the range of the addresses. In another embodiment, creating the record includes maintaining a mirror of the record on the secondary storage subsystem, and wherein transferring the data in the range includes selecting the data to be transferred from the second volatile cache memory to the second non-volatile storage media responsively to the mirror.

In other embodiments, transferring the data includes sending a message from the primary storage subsystem to the secondary storage subsystem indicating addresses of the data that have been transferred to the first non-volatile storage media, and the method further includes creating a record on the secondary storage subsystem of the addresses of the data copied to the secondary storage subsystem, and updating the record in response to the message.

There is also provided, in accordance with an embodiment of the present invention, a data storage system, including:

a primary storage subsystem, which includes a first volatile cache memory and first non-volatile storage media; and a secondary storage subsystem, which includes a second volatile cache memory and second non-volatile storage media, wherein the primary storage subsystem is arranged to receive data from a host processor, to write the data to the first volatile cache memory, to copy the data to the secondary storage subsystem, and to transfer the data from the first volatile cache memory to the first non-volatile storage media, and wherein the secondary storage subsystem is arranged to receive and write the copied data to the second volatile cache memory, to transfer the data from the first volatile cache memory to the first non-volatile storage media, and to return an acknowledgment to the primary storage subsystem responsively to writing the copied data to the second volatile cache memory and prior to transferring the data to the second non-volatile storage media, wherein the primary storage subsystem is arranged to signal the host processor that the data have been stored in the data storage system responsively to the acknowledgment from the secondary storage subsystem.

There is additionally provided, in accordance with an embodiment of the present invention, a computer software product for use in a data storage system including primary and secondary storage subsystems, which include respective first and second control units, respective first and second volatile cache memories, and respective first and second non-volatile storage media, the product including a computer-readable medium in which program instructions are stored, which instructions, when read by the first and second control units, cause the first control unit to receive data from a host processor, to write the data to the first volatile cache memory, to copy the data to the secondary storage subsystem, and to transfer the data from the first volatile cache memory to the first non-volatile storage media, and cause the second control unit to receive and write the copied data to the second volatile cache memory, to transfer the data from the first volatile cache memory to the first non-volatile storage media, and prior to transferring the data to the second non-volatile storage media, to return an acknowledgment to the primary storage subsystem responsively to writing the copied data to the second volatile cache memory, wherein the instructions further cause the first control unit to signal the host processor that the data have been stored in the data storage system responsively to the acknowledgment from the secondary storage subsystem.

The present invention will be more fully understood from the following detailed description of the embodiments thereof, taken together with the drawings in which:

DETAILED DESCRIPTION OF EMBODIMENTS

Figure 1:
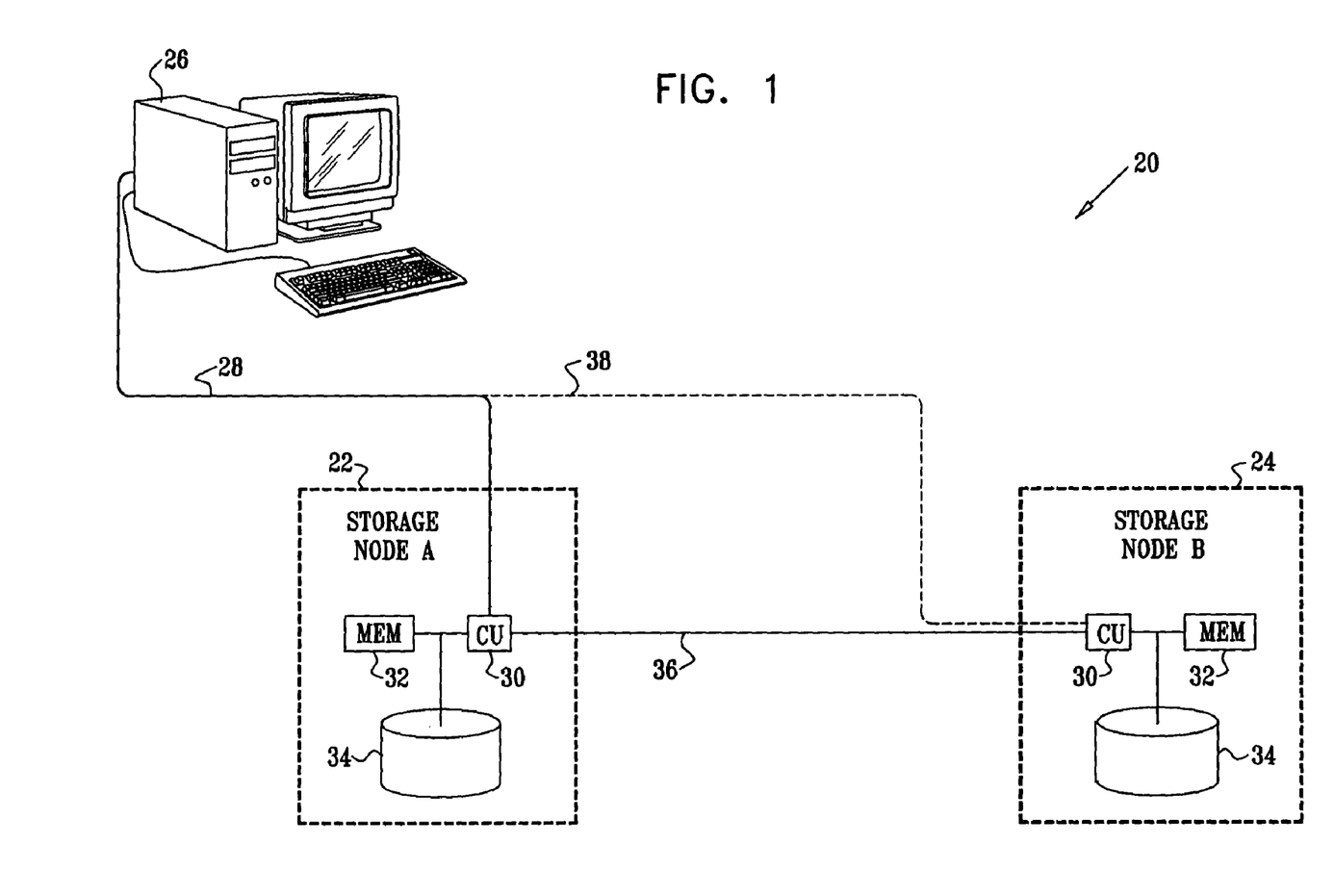
FIG. 1 is a block diagram that schematically illustrates a data storage system, in accordance with an embodiment of the present invention.

FIG. 1 is a block diagram that schematically illustrates a data storage system 20, in accordance with an embodiment of the present invention. System 20 comprises storage subsystems 22 and 24, which are labeled "storage node A" and storage node B" for convenience. In the description that follows, it is assumed that node A is configured as the primary storage subsystem, while node B is configured as the secondary storage subsystem for purposes of data mirroring. Thus, to write and read data to and from system 20, a host computer 26 (referred to hereinafter simply as a "host") communicates over a communication link 28 with subsystem 22. Typically, link 28 is part of a computer network, such as a storage area network (SAN). Alternatively, host 26 may communicate with subsystem 22 over substantially any suitable type of serial or parallel communication link. Although for the sake of simplicity, only a single host is shown in FIG. 1, system 20 typically serves multiple hosts. Typically, in normal operation, hosts may write data only to primary storage subsystem 22, but may read data from either subsystem 22 or 24.

Subsystems 22 and 24 may likewise comprise substantially any suitable type of storage device known in the art, such as a storage server, SAN disk device or network-attached storage (NAS) device. Subsystems 22 and 24 may even comprise computer workstations, which are configured and programmed to carry out the storage functions described herein. Subsystems 22 and 24 may be collocated in a single facility or, for enhanced data security, they may be located at mutually-remote sites. Although system 20 is shown in FIG. 1 as comprising only a single primary storage subsystem and a single secondary storage subsystem, the principles of the present invention may be applied in a straightforward manner to systems having greater numbers of primary and/or secondary storage subsystems. For example, the methods described hereinbelow may be extended to a system in which data written to a primary storage subsystem are mirrored on two different secondary storage subsystems in order to protect against simultaneous failures at two different points.

Each of subsystems 22 and 24 comprises a control unit (CU) 30, typically comprising one or more microprocessors, with a cache 32 and non-volatile storage media 34. Typically, cache 32 comprises volatile random-access memory (RAM), while storage media 34 comprise a magnetic disk or disk array. Alternatively, other types of volatile and non-volatile media may be used to carry out the cache and storage functions of subsystems 22 and 24. Control units 30 typically carry out the operations described herein under the control of software, which may be downloaded to subsystems 22 and 24 in electronic form, over a network, for example, or may be provided, alternatively or additionally, on tangible media, such as CD-ROM. Subsystems 22 and 24 communicate between themselves over a high-speed communication link 36, which may be part of a SAN or other network, or may alternatively be a dedicated line between the two subsystems. Subsystem 24 may also be coupled to communicate with host 26, as well as with other hosts (not shown), over a communication link 38, similar to link 28. Link 38 enables subsystem 24 to serve as the primary storage subsystem in the event of a failure in subsystem 22.

Figure 2:
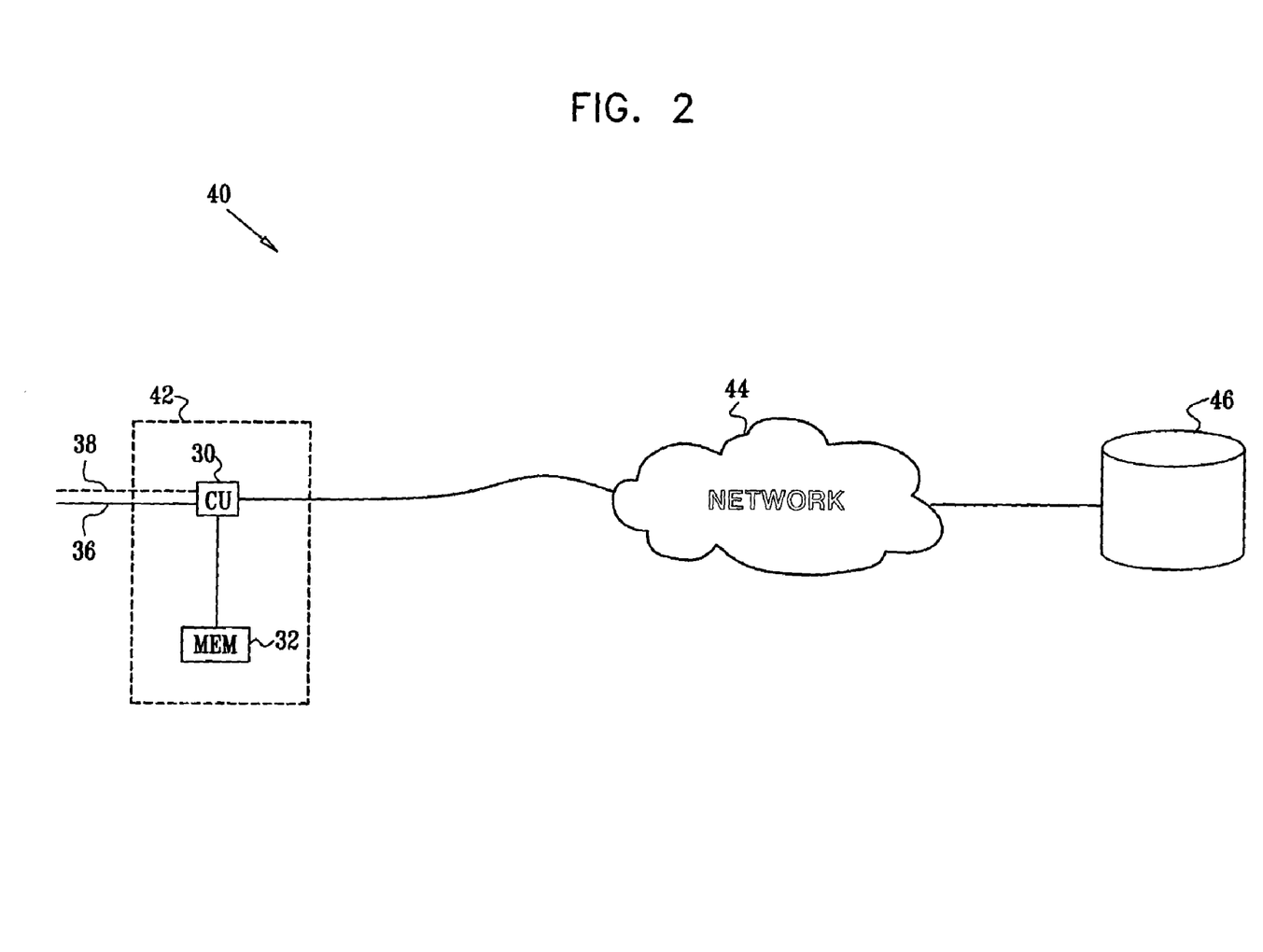
FIG. 2 is a block diagram that schematically illustrates a storage subsystem, in accordance with an alternative embodiment of the present invention.

FIG. 2 is a block diagram that schematically illustrates a storage subsystem 40, in accordance with an alternative embodiment of the present invention. Subsystem 40 may be used, for example, in place of storage subsystem 24 in system 20 (FIG. 1). Subsystem 40 is a sort of virtual storage node, made up of a local controller 42 and a remote disk 46. Controller 42 comprises CU 30 and memory 32, similar to the CU and memory used in subsystems 22 and 24. Disk 46, however, is not connected directly to CU 30, but instead communicates with the CU via a network 44. (For this purpose, disk 46 typically comprises a communication controller, not shown in the figures.) In this configuration, CU 30 may write and read data to and from disk 46 using a suitable network protocol, such as iSCSI, as is known in the art.

The configuration of subsystem 40 is advantageous in that it allows the control units of the primary and secondary storage subsystems to be located at the same site, while disk 46 is located at a remote site. This arrangement facilitates rapid communication between the control units (thus reducing the latency of the data writing protocol described hereinbelow), while keeping backup data in disk 46 at a safe distance in case of a disaster at the primary site.

Alternatively, controller 42 of subsystem 40 may be held in particularly secure conditions at a first remote site not far from subsystem 22, while disk 46 of subsystem 40 is farther away, at a second remote site. This arrangement is advantageous in that it maintains data security, without introducing long write latency due to the large distance between the locations of the storage media in the primary and secondary subsystems. The first remote site may be maintained by an outside service provider, who provides secure storage on a fee-per-service basis to the owner of subsystem 22 and to other storage users, thus relieving the storage users of the need to maintain more than two storage locations. The second remote site may be maintained by the outside service provider, as well.

Figure 3:
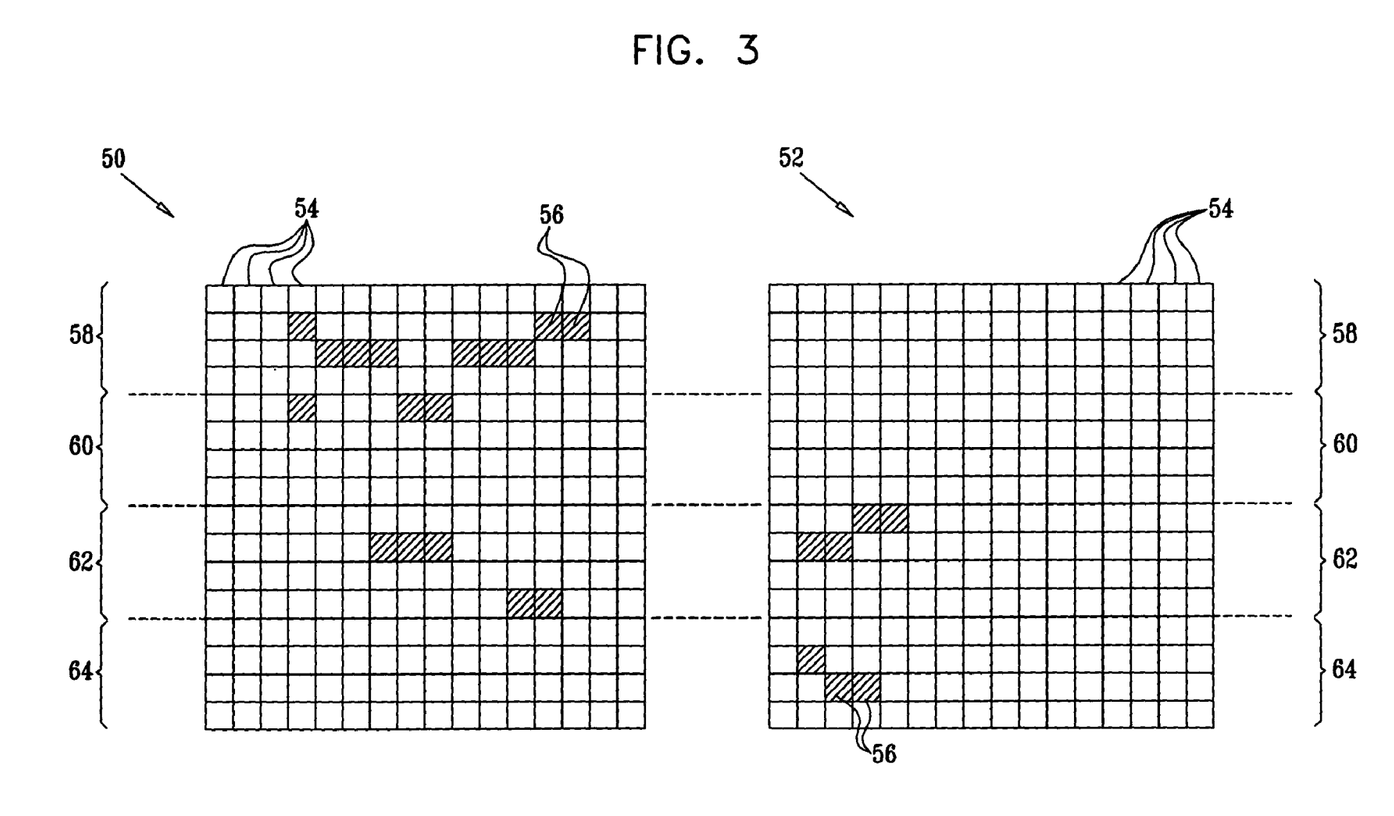
FIG. 3 is a schematic representation of bitmaps used in tracking data storage, in accordance with an embodiment of the present invention.

FIG. 3 schematically shows bitmaps 50 and 52, which are used by CU 30 in each of subsystems 22 and 24 for recording changes in the data stored by the other subsystem, in accordance with an embodiment of the present invention. The use of these bitmaps is described hereinbelow in detail with reference to FIGS. 4 and 5. Briefly, each bitmap 50, 52 comprises multiple bits 54, each corresponding to a storage element on disk 34. For example, each bit may correspond to a different track on the disk, or to some larger or smaller range of physical addresses on the disk. Certain bits 56 are marked by the CU (i.e., the bits are set in the bitmap) in each of subsystems 22 and 24 to indicate that data have been written to the cache in the other subsystem prior to transfer of the data to the corresponding storage elements on the disk. Alternatively, other types of data structures, as are known in the art, may be used for maintaining records of the status of data in caches 32.

Each CU 30 subsequently clears the marked bits 56 in its bitmap 50 or 52 when the CU is notified, as described hereinbelow, that the data have been transferred from cache 32 to disk 34 on the other storage subsystem. This process of transferring data from cache to disk may also be referred to as "hardening" or "destaging" the data. (In the context of the present patent application and in the claims, "hardening" refers to any transfer of data from cache to disk, while "destaging" is used in reference to a "destage scan," whereby the CU performs an orderly transfer to disk of all the data in the cache or in a range of the cache. In other words, the destage scan hardens all the data in a range of the cache or in the entire cache.)

Although the process of transferring data to disk may be applied to the entire cache at once—whereupon the CU clears the entire bitmap when the process is completed—it may be more efficient to apply the process to smaller ranges of addresses (i.e., smaller groups of tracks or other storage elements) on the disk. For this purpose, each of bitmaps 50 and 52 is divided into ranges 58, 60, 62 and 64. Each range is effectively treated as a separate cache for purposes of tracking data transfer to disk. For each range, one of bitmaps 50 and 52 is treated as the current bitmap, in which CU 30 marks the appropriate bits when data are written to cache on the other subsystem, while the other bitmap is treated as the old bitmap, as described below. Although four ranges are shown in FIG. 3, cache 32 may alternatively be divided into a larger or smaller number of ranges for these purposes.

Figure 4:
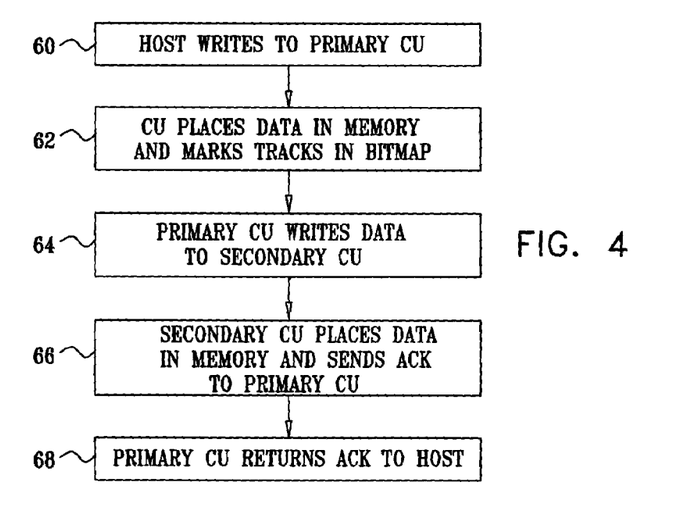
FIG. 4 is a flow chart that schematically illustrates a method for writing data to a data storage system, in accordance with an embodiment of the present invention.

FIG. 4 is a flow chart that schematically illustrates a method used in writing data from host 26 to storage system 20, in accordance with an embodiment of the present invention. The method is invoked when host 26 writes data over link 28 to the primary storage subsystem, i.e., subsystem 22 in the present example, at a host writing step 60. Upon receiving the data, CU 30 of subsystem 22 places the data in cache 32, at a data caching step 62. CU 30 determines the track or tracks in which the data are to be stored on disks 34 in subsystems 22 and 24, and marks the corresponding bits 54 in the current bitmap 50 or 52. (As noted above, the bitmaps are just one example of a data structure that can be used to keep a record of the cache status, and each bit may alternatively correspond to a data element that is larger or smaller than a single track on the disk.) CU 30 of subsystem 22 then writes the data to subsystem 24 via link 36, at a data copying step 64.

CU 30 of secondary storage subsystem 24 receives the data over link 36, at a secondary receiving step 66. The CU of subsystem 24 places the data in its cache 32, and marks the bits in its bitmap 50 or 52 that correspond to the tracks for which the data are destined. Marked bits 56 in the bitmap held by secondary storage subsystem 24 indicate that primary storage subsystem 22 may have data in its cache that have not yet been written to the corresponding tracks on disk 34 of subsystem 22. After writing the data to cache 32, CU 30 of subsystem 24 sends an acknowledgment over link 36 to subsystem 22. Upon receiving the acknowledgment, CU 30 of subsystem 22 signals host 26, at an acknowledgment step 26, to acknowledge to the host operating system that the write operation was successfully completed. The acknowledgment is issued to host 26 independently of operations carried out on subsystems 22 and 24 to store the cached data to disks 34. Thus, the acknowledgment may typically be issued while the data are still in the volatile cache and before the data have actually been stored on disks 34 or any other non-volatile media.

Once data have been written to cache 32, each CU 30 proceeds to transfer the data to disk 34. After a given track or range of tracks has been hardened in this manner on one of the storage subsystems, the CU notifies the other storage subsystem, which then clears the corresponding bits in its old bitmap. The notification preferably refers to a range of tracks, rather than just a single track, since sending notifications too frequently creates substantial overhead traffic on link 36 between subsystems 22 and 24. Some methods that can be used to perform data hardening and to convey these "hardening notifications" efficiently are described hereinbelow. When the CU of one subsystem is notified that a given set of tracks has been hardened on the other subsystem, it clears the corresponding marked bits 56 on the old bitmap. In the meanwhile, as the CU receives new write data (at step 62 or 66 above), it marks the corresponding bits in the current bitmap. A logical "OR" of the current and old bitmaps held by the CU in each of subsystems 22 and 24 then gives a map of all the tracks containing data that may not yet have been hardened on the other subsystem.

Figure 5:
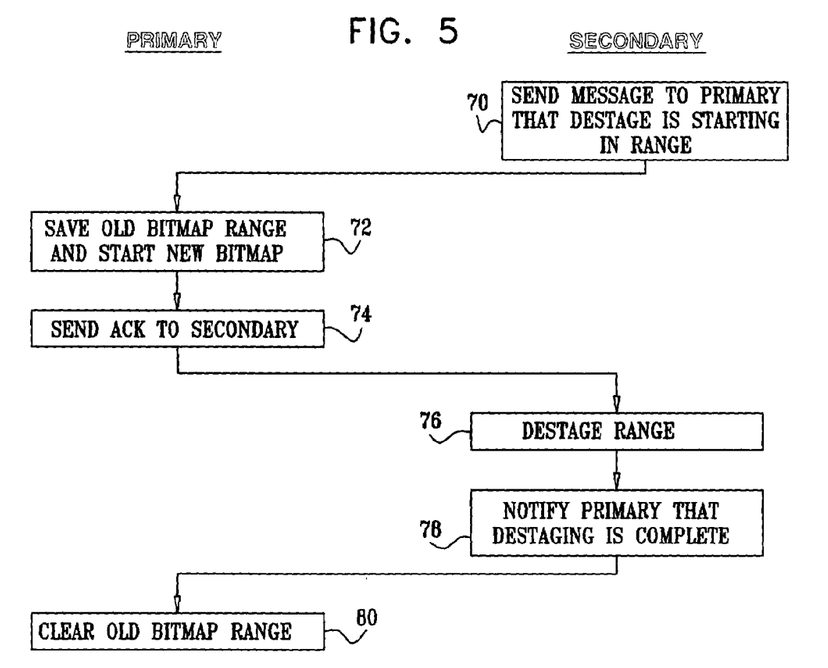
FIG. 5 is a flow chart that schematically illustrates a method for tracking data storage, in accordance with an embodiment of the present invention.

FIG. 5 is a flow chart that schematically illustrates one method for tracking data hardening in system 20, in accordance with an embodiment of the present invention. This method is based on performing a destage scan, whereby CU 30 of secondary subsystem 24 periodically scans its cache 32 (or scans a part of the cache corresponding to one of range 58, 60, 62 or 64) and writes all unhardened data to disk 34. Secondary storage subsystem 24 notifies primary storage subsystem 22 as the secondary subsystem destages each range. The identical method may be used to notify the secondary subsystem of a destage scan on the primary subsystem. Typically, the destage scan takes place at predetermined intervals or, alternatively or additionally, when CU 30 determines that the amount of unhardened data in a certain range of the cache (which may include the entire cache) is greater than some predetermined threshold. Note that in between these destaging operations, CU 30 may continue hardening data intermittently according to other criteria, as is known in the art.

Before beginning the destage scan, CU 30 of subsystem 24 sends a message over link 36 to subsystem 22 to indicate that the scan has started, at a starting step 70. The message indicates the range of the cache that is to be destaged. By way of example, let us assume that the destage scan is to be applied to range 58. The range may alternatively include the entire cache. Upon receiving the message, CU 30 of subsystem 22 saves its current bitmap of range 58 (in which it has marked the tracks for which data have been written to subsystem 24 up to this point) as the old bitmap of range 58, at an old bitmap saving step 72. Referring to FIG. 3, let us assume that bitmap 50 has been in use up to this point as the current bitmap for range 58, and includes marked bits 56. Range 58 of bitmap 50 is now saved as the old bitmap. Any previously-saved old bitmap of range 58 is discarded. From this point forth, CU 30 of subsystem 22 uses bitmap 52 as the current bitmap for range 58, so that any tracks to which new data are written to cache in range 58 will now be recorded in bitmap 52. Cu 30 of subsystem 22 then returns an acknowledgment to subsystem 24, at an acknowledgment step 74.

Upon receiving the acknowledgment, CU 30 of subsystem 24 begins its destage scan of range 58, at a destaging step 76. When destaging of the entire range is finished, CU 30 of subsystem 24 sends another message to subsystem 22, indicating that the scan has been completed, at a completion message step 78. Upon receiving the message, CU 30 of subsystem 22 clears all the bits 54 in range 58 of bitmap 50 (the old bitmap), at a bitmap clearing step 80.

Range 64 in FIG. 3 shows an example of an old bitmap range that has been cleared in bitmap 50, following which new bits 56 are marked in bitmap 52. As another example, in range 62, a destage scan has started with respect to old bitmap 50, but has not yet been completed, so that some bits in range 62 of bitmap 50 are still marked. Meanwhile, as new data are written during the destage scan, CU 30 of subsystem 22 has begun to mark bits in range 62 of the new current bitmap 52. Although in these examples, for the sake of clarity and convenience, bitmap 50 is referred to as the old bitmap, while bitmap 52 is referred to as the current bitmap, in actual operation the roles of "old" and "current" bitmap toggle back and forth between the two bitmaps.

To illustrate failure recovery in system 20, let us assume that subsystem 22 has failed, while subsystem 24 remains operational. At the time of failure, CU 30 of subsystem 24 held bitmaps 50 and 52. The union (logical OR) of all the bits that are marked in the two bitmaps indicates all the tracks of data in cache 32 of subsystem 22 that may have contained unhardened data at the time of failure. In fact, some of these tracks may already have been hardened, although notification did not reach subsystem 24. It can be said with certainty, however, that there are no tracks that have not been hardened on subsystem 22 whose corresponding bits are not marked in the union of bitmaps 50 and 52 held by CU 30 on subsystem 24. In other words, the union of these bitmaps represents a superset of all the unhardened tracks on subsystem 22.

At the time of failure, system 20 may "failover" to subsystem 24, so that subsystem 24 now serves as the primary (and only) storage subsystem. In this case, CU 30 of subsystem 24 maintains a further record, typically by marking additional bits in the united bitmap, indicating the tracks to which data are written while subsystem 22 is out of service.

When subsystem 22 is ready to return to service, CU 30 in subsystem 22 performs initial machine loading, as is known in the art, and then asks subsystem 24 for a data update. CU 30 of subsystem 24 then transfers to subsystem 22 the data in all the tracks that are marked in the united bitmap. Once the transfer is complete, subsystem 22 may resume operation as the primary storage subsystem.

Alternatively, other methods may be used for clearing bits in bitmaps 50 and 52, besides the periodic destaging method shown in FIG. 5. The method described above is advantageously simple, in that it allows each subsystem 22 and 24 to maintain bitmaps 50 and 52 (or other data structures) only with respect to the unhardened tracks on the other system. In some alternative embodiments of the present invention, control units 30 on both of subsystems 22 and 24 maintain similar bitmaps 50 and 52 with respect to the data tracks that have been copied from subsystem 22 to subsystem 24. In other words, each subsystem maintains two sets of bitmaps: a first set indicating the tracks that may not yet have been hardened on the other subsystem, and a second set mirroring the first set of bitmaps maintained by the other subsystem. Because the bitmaps in the first set maintained by each subsystem are generated as a result of messages received from the other subsystem (as described above with reference to FIG. 4), it is a straightforward matter for each subsystem to build and maintain its second set of bitmaps based on the messages that it transmits to the other subsystem.

Figure 6:
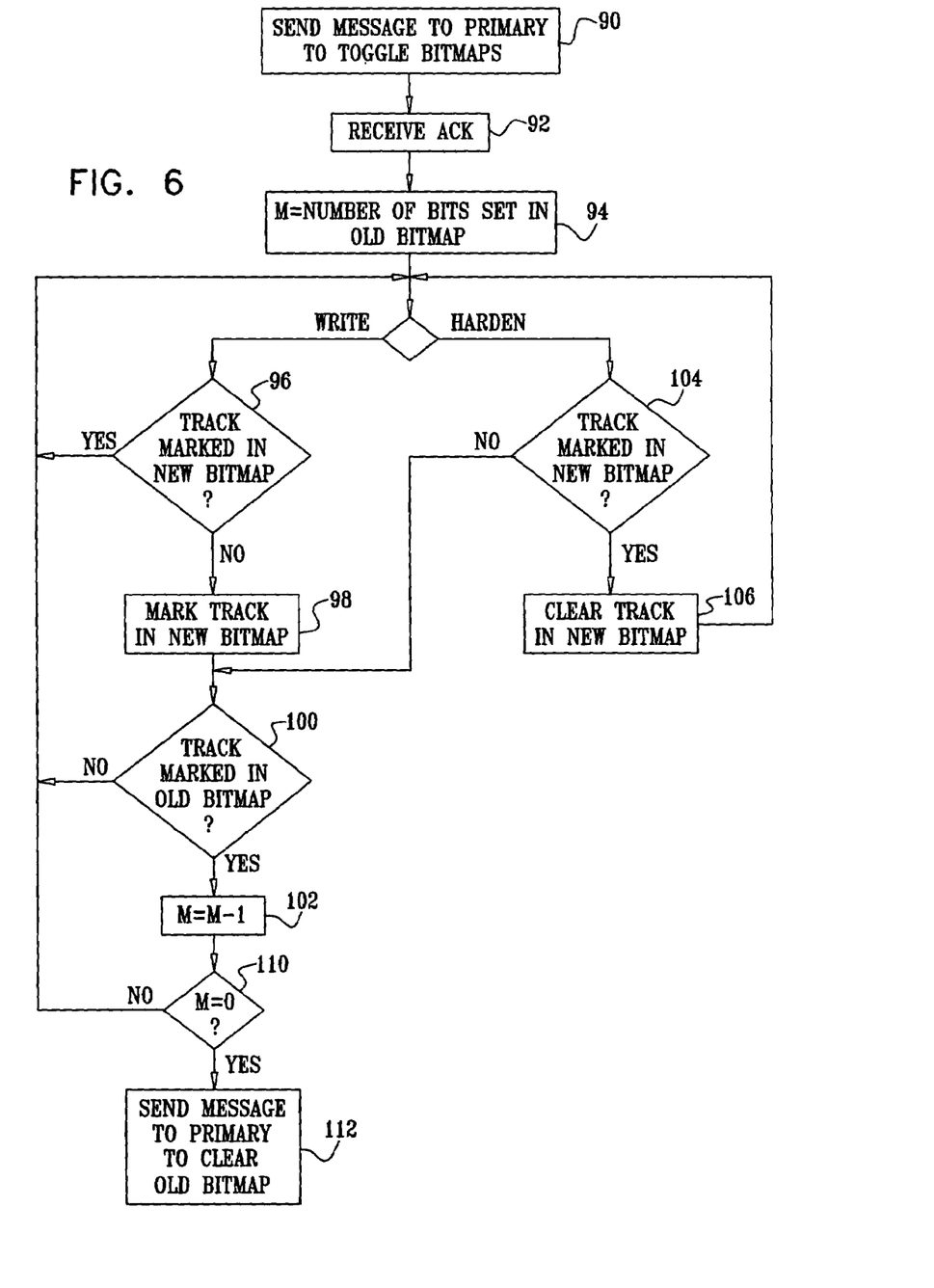
FIG. 6 is a flow chart that schematically illustrates a method for tracking data storage, in accordance with another embodiment of the present invention.

FIG. 6 is a flow chart that schematically illustrates one such method, in accordance with an embodiment of the present invention. We again consider tracking of data hardening on subsystem 24 (although the method may likewise be applied to hardening of data on subsystem 22). Again taking region 58 as an example, as subsystem 22 conveys data to subsystem 24, both subsystems mark bits 56 in region 58 of bitmap 50 (in the above-mentioned "first set" of bitmaps maintained by subsystem 22 and in the "second set" of mirror bitmaps maintained by subsystem 24) to indicate the tracks that are to be hardened. Subsystem 24 increments a counter N for each new bit that is marked in range 58 (and similarly in ranges 60, 62 and 64). When subsystem 24 hardens a track in region 58, it clears the bit and decrements N, without notifying subsystem 22. Subsystem 24 may choose the tracks to harden using any suitable criterion, such as hardening least-recently-used tracks. There is no need for subsystem 24 to perform an orderly destaging of an entire region, as in the method of FIG. 5.

Periodically, subsystem 24 sends a message to subsystem 22 to indicate that it is about to switch to a new bitmap for a given region, say region 58, at a toggle notification step 90. Subsystem 24 then waits for subsystem 22 to acknowledge the message, at an acknowledgment step 92. Region 58 of bitmap 50, the old bitmap of the region, is then locked in both subsystems 22 and 24, and all subsequent data writes to the region are marked in bitmap 52, the new bitmap. A counter M for region 58 of the old bitmap is initialized to the value N, i.e., to the number of bits that are set in this region of the old bitmap, at a counter setting step 94. A new counter N for region 58 in bitmap 52 is set initially to zero and is then incremented and decremented as described above.

Subsystem 24 meanwhile continues to harden the tracks that are marked in region 58 of bitmap 50 as containing cached data that are yet to be hardened, as well as to receive further data from subsystem 22 to write to the tracks in this region. When subsystem 24 receives data to be written to a given track, it checks to determine whether this track is already marked in the new bitmap of region 58, at a new track write checking step 96. If so (indicating that there has already been a write to this track since the last bitmap toggle), no further marking of either the old or new bitmap is required. If this track is not yet marked in the new bitmap, however, subsystem 24 marks the track in the new bitmap, at a track marking step 98. Subsystem 24 then checks whether this track is marked in the old bitmap, at an old track checking step 100. If so, subsystem 24 decrements M, at a counter decrementation step 102. Otherwise, the counter is not decremented.

Meanwhile, whenever subsystem 24 hardens a data track, it checks to determine whether this track is marked in the new bitmap of region 58, at a new track hardness checking step 104. If so, subsystem 24 clears the corresponding bit in the new bitmap, at a track clearing step 106 (as well as decrementing counter N with respect to region 58 of the new bitmap, as noted above). No action is required in this case with regard to the old bitmap, because counter M was already decremented with respect to this track, at step 102, when the track was marked in the new bitmap at step 98. On the other hand, if the track that has been hardened is not marked in the new bitmap, subsystem 24 checks to determine whether the track is marked in the old bitmap of region 58, at step 100. If so, subsystem 24 decrements M at step 102.

Subsystem 24 checks to determine when M reaches zero, at a termination testing step 110. When M drops to zero, it means that all the tracks that were previously marked in the old bitmap have now either been hardened or marked in the new bitmap, so that the old bitmap is no longer needed by subsystem 22. Therefore, subsystem 24 notifies subsystem 22 that it should clear all the bits in region 58 of old bitmap 50, as at step 80 in the method of FIG. 5. The process of FIG. 6 toggles back and forth between bitmaps 50 and 52, as described above.

As another alternative, again based on maintaining a second set of mirror bitmaps, as described above, is similar to the method of FIG. 5, except that subsystem 24 selectively hardens certain tracks in a given region at step 76, rather than destaging the entire region. Subsystem 24 may choose the tracks to harden by comparing its old mirror bitmap to a bitmap of unhardened tracks in its own local cache 32.

Subsystem 24 hardens all tracks that are marked in both the old bitmap and the local cache. Upon finishing this step, subsystem 24 notifies subsystem 22 that it can now clear its old bitmap of the region in question (since all the data written to the tracks in this region have been hardened on at least one of the subsystems).

As noted above, although certain configurations of system 20 and certain particular data mirroring protocols are described above in order to illustrate the principles of the present invention, these principles may similarly be applied in other system configurations and using other protocols, as will be apparent to those skilled in the art. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for storing data in a data storage system that includes primary and secondary storage subsystems, including respective first and second volatile cache memories and respective first and second non-volatile storage media, the method comprising:

receiving the data at the primary storage subsystem from a host processor;

writing the data to the first volatile cache memory in the primary storage subsystem;

copying the data from the primary storage subsystem to the secondary storage subsystem;

writing the copied data to the second volatile cache memory in the secondary storage subsystem;

returning an acknowledgment from the secondary storage subsystem to the primary storage subsystem responsively to writing the copied data to the second volatile cache memory and prior to saving the data in the second non-volatile storage media;

signaling the host processor that the data have been stored in the data storage system responsively to the acknowledgment from the secondary storage subsystem; and transferring the data in the primary and secondary storage subsystems from the first and second volatile cache memories to the first and second non-volatile storage media, respectively.

2. The method according to claim 1, wherein copying the data comprises transmitting the data between mutually-remote sites over a communication link between the sites.

3. The method according to claim 1, wherein the second volatile cache memory and the second non-volatile storage media are located in mutually-remote sites, and wherein transferring the data comprises transmitting the data from the second volatile cache memory to the second non-volatile storage media over a communication link between the sites.

4. The method according to claim 1, wherein copying the data comprises creating a mirror on the secondary storage subsystem of the data received by the primary storage subsystem.

5. The method according to claim 4, and comprising, upon occurrence of a failure in the primary storage subsystem, configuring the secondary storage subsystem to serve as the primary storage subsystem so as to receive further data from the host processor to be stored by the data storage system.

6. The method according to claim 4, wherein the second volatile cache memory is located in a site remote from the primary storage subsystem and is operated by a service provider other than an owner of the primary storage subsystem, and wherein transferring the data from the second volatile cache memory to the second non-volatile storage media comprises processing the data on a fee-per-service basis.

7. The method according to claim 1, wherein transferring the data comprises sending a message from the secondary storage subsystem to the primary storage subsystem indicating addresses of the data that have been transferred to the second non-volatile storage media, and wherein the method further comprises creating a record on the primary storage subsystem of the addresses of the data copied to the secondary storage subsystem, and updating the record in response to the message.

8. The method according to claim 7, and further comprising, upon recovery of the system from a failure of the secondary storage subsystem, conveying, responsively to the record, a portion of the data from the primary storage subsystem to be stored on the secondary storage subsystem.

9. The method according to claim 8, wherein updating the record comprises removing from the record the addresses of the data that have been transferred to the second non-volatile storage media.

10. The method according to claim 7, wherein creating the record comprises marking respective bits in a bitmap corresponding to addresses of the data copied to the secondary storage subsystem, and wherein updating the record comprises clearing the respective bits.

11. The method according to claim 7, wherein transferring the data comprises transferring the data in a range of the addresses from the second volatile cache memory to the second non-volatile storage media, and wherein sending the message comprises informing the primary storage subsystem that the data in the range have been transferred, so that the primary storage subsystem updates the record with respect to the range.

12. The method according to claim 11, wherein transferring the data in the range comprises destaging the range of the addresses.

13. The method according to claim 11, wherein creating the record comprises maintaining a mirror of the record on the secondary storage subsystem, and wherein transferring the data in the range comprises selecting the data to be transferred from the second volatile cache memory to the second non-volatile storage media responsively to the mirror.

14. The method according to claim 1, wherein transferring the data comprises sending a message from the primary storage subsystem to the secondary storage subsystem indicating addresses of the data that have been transferred to the first non-volatile storage media, and wherein the method further comprises creating a record on the secondary storage subsystem of the addresses of the data copied to the secondary storage subsystem, and updating the record in response to the message.

15. The method according to claim 14, and further comprising, upon recovery of the system from a failure of the primary storage subsystem, conveying, responsively to the record, a portion of the data from the secondary storage subsystem to be stored on the primary storage subsystem.

16. The method according to claim 15, wherein updating the record comprises removing from the record the addresses of the data that have been transferred to the primary non-volatile storage media.

17. The method according to claim 14, wherein creating the record comprises marking respective bits in a bitmap corresponding to addresses of the data copied to the secondary storage subsystem, and wherein updating the record comprises clearing the respective bits.

18. The method according to claim 14, wherein transferring the data comprises transferring the data in a range of the addresses from the first volatile cache memory to the first non-volatile storage media, and wherein sending the message comprises informing the secondary storage subsystem that the data in the range have been transferred, so that the secondary storage subsystem updates the record with respect to the range.

19. The method according to claim 18, wherein transferring the data in the range comprises destaging the range of the addresses.

20. The method according to claim 18, wherein creating the record comprises maintaining a mirror of the record on the primary storage subsystem, and wherein transferring the data in the range comprises selecting the data to be transferred from the first volatile cache memory to the first non-volatile storage media responsively to the mirror.

21. A data storage system, comprising:
   a primary storage subsystem, which comprises a first volatile cache memory and first non-volatile storage media; and
   a secondary storage subsystem, which comprises a second volatile cache memory and second non-volatile storage media,
   wherein the primary storage subsystem is arranged to receive data from a host processor, to write the data to the first volatile cache memory, to copy the data to the secondary storage subsystem, and to transfer the data from the first volatile cache memory to the first non-volatile storage media, and
   wherein the secondary storage subsystem is arranged to receive and write the copied data to the second volatile cache memory, to transfer the data from the second volatile cache memory to the second non-volatile storage media, and to return an acknowledgment to the primary storage subsystem responsively to writing the copied data to the second volatile cache memory and prior to transferring the data to the second non-volatile storage media,
   wherein the primary storage subsystem is arranged to signal the host processor that the data have been stored in the data storage system responsively to the acknowledgment from the secondary storage subsystem.

22. The system according to claim 21, wherein the primary and secondary storage subsystems are located at mutually-remote sites, and are coupled to communicate over a communication link between the sites.

23. The system according to claim 21, wherein the second volatile cache memory and the second non-volatile storage media are located in mutually-remote sites, and wherein the secondary storage subsystem is arranged to transfer the data from the second volatile cache memory to the second non-volatile storage media over a communication link between the sites.

24. The system according to claim 21, wherein the secondary storage subsystem is arranged to mirror the data held by the primary storage subsystem.

25. The system according to claim 24, wherein the secondary storage subsystem is configurable, upon occurrence of a failure in the primary storage subsystem, to serve as the primary storage subsystem so as to receive further data from the host processor to be stored by the data storage system.

26. The system according to claim 21, wherein the second volatile cache memory is located in a site remote from the primary storage subsystem and is operated on a fee-per-service basis by a service provider other than an owner of the primary storage subsystem.

27. The system according to claim 21, wherein the secondary storage subsystem is arranged to send a message to the primary storage subsystem indicating addresses of the data that have been transferred to the second non-volatile storage media, and wherein the primary storage subsystem is arranged to create a record of the addresses of the data copied to the secondary storage subsystem, and to update the record in response to the message.

28. The system according to claim 27, wherein the primary storage subsystem is arranged, upon recovery of the system from a failure of the secondary storage subsystem, to convey, responsively to the record, a portion of the data from the primary storage subsystem to be stored on the secondary storage subsystem.

29. The system according to claim 28, wherein the primary storage subsystem is arranged to remove from the record the addresses of the data that have been transferred to the second non-volatile storage media.

30. The system according to claim 27, wherein the primary storage subsystem is arranged to create the record by marking respective bits in a bitmap corresponding to addresses of the data copied to the secondary storage subsystem, and to update the record by clearing the respective bits in response to the message.

31. The system according to claim 27, wherein the secondary storage subsystem is arranged to transfer the data over a range of the addresses from the second volatile cache memory to the second non-volatile storage media, and to indicate in the message that the data in the range have been transferred, so that the primary storage subsystem updates the record with respect to the range.

32. The system according to claim 31, wherein the secondary storage subsystem is arranged to transfer the data by destaging the range of the addresses.

33. The system according to claim 31, wherein the secondary storage subsystem is arranged to maintain a mirror of the record, and to select the data to be transferred from the second volatile cache memory to the second non-volatile storage media responsively to the mirror.

34. The system according to claim 21, wherein the primary storage subsystem is arranged to send a message to the secondary storage subsystem indicating addresses of the data that have been transferred to the first non-volatile storage media, and wherein the secondary storage subsystem is arranged to create a record of the addresses of the data copied to the secondary storage subsystem, and to update the record in response to the message.

35. The system according to claim 34, wherein the secondary storage subsystem is arranged, upon recovery of the system from a failure of the primary storage subsystem, to convey, responsively to the record, a portion of the data from the secondary storage subsystem to be stored on the primary storage subsystem.

36. The system according to claim 35, wherein the secondary storage subsystem is arranged to remove from the record the addresses of the data that have been transferred to the first non-volatile storage media.

37. The system according to claim 34, wherein the secondary storage subsystem is arranged to create the record by marking respective bits in a bitmap corresponding to addresses of the data copied to the secondary storage subsystem, and to update the record by clearing the respective bits in response to the message.

38. The system according to claim 34, wherein the primary storage subsystem is arranged to transfer the data over a range of the addresses from the first volatile cache memory to the first non-volatile storage media, and to indicate in the message that the data in the range have been transferred, so that the secondary storage subsystem updates the record with respect to the range.

39. The system according to claim 38, wherein the primary storage subsystem is arranged to transfer the data by destaging the range of the addresses.

40. The system according to claim 38, wherein the primary storage subsystem is arranged to maintain a mirror of the record, and to select the data to be transferred from the first volatile cache memory to the first non-volatile storage media responsively to the mirror.

* * * * *